INVENTORS
GERHARD BEYER
HERMANN NAGELSMANN

United States Patent Office 3,713,875
Patented Jan. 30, 1973

3,713,875
FILTER- AND SCREEN CLOTHS MADE FROM COATED POLYESTER MATERIAL
Gerhard Beyer, Hofheim, Taunus, and Hermann Nagelsmann, Schwalbach, Taunus, Germany, assignors to Farbwerke Hoechst Aktiengesellschaft vormals Meister Lucius & Bruning, Frankfurt am Main, Germany
Filed May 1, 1970, Ser. No. 33,746
Claims priority, application Germany, May 5, 1969,
G 69 18 165.3
Int. Cl. B44d 1/02
U.S. Cl. 117—98         6 Claims

ABSTRACT OF THE DISCLOSURE

The present invention relates to filter- and screen cloths made from polyester yarns, polyester cord yarns or polyester monofils which have been coated with a thermoplastic material being resistant to hydrolysis and melting at a temperature above 130° C. The polyester yarns, -cord yarns or -monofils consisting, for example, of polyethylene terephthalate; the coating may consist, for example, of polyethylene, polypropylene or poly-(4-methylpentene-1).

---

Figure 1:
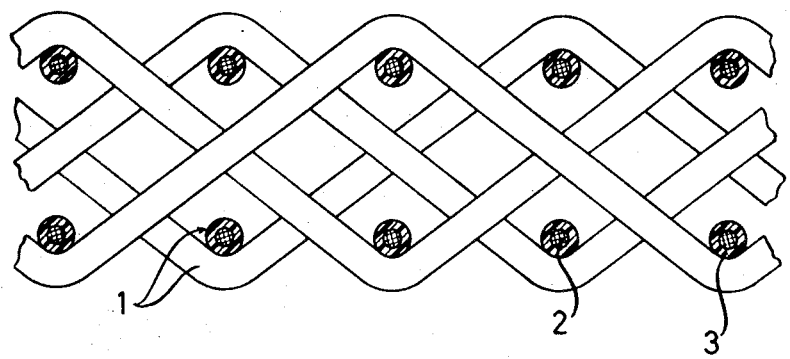

The present invention relates to filter- and screen cloths made from coated polyester material.

There are known filter- and screen cloths made not only from the conventional polyester multifil material but also from the conventional polyester monofil material. These cloths, however, do not meet all requirements as regards their resistivity to hydrolytic degradation when being subjected to the prolonged action of acid or alkaline—possibly also hot—aqueous solutions. Attempts have been made to overcome this drawback on the one hand by developing and using polyester monofil types which are especially resistant to hydrolysis, on the other hand by finishing the polyester multifil material correspondingly. It is true that a certain improvement was obtained with the use of the polyester monofil types which are especially resistant to hydrolysis; however, on account of the special finishing of the polyester multifil material, there was hardly obtained an improvement of the resistance to hydrolysis since it is difficult to apply the finish in such a manner that it is entirely free from pores.

It is the object of the present invention to develop a filter- and screen cloth which is entirely or substantially resistant to hydrolysis.

The present invention provides a filter- and screen cloth made from polyester yarns, -cord yarns and/or -monofils in which the polyester yarns, -cord yarns and/or monofils are coated with a thermoplastic material being resistant to hydrolysis and melting at a temperature above approximately 130° C.

The filter- and screen cloths of the invention may consist not only entirely of coated polyester yarns, -cord yarns or -monofils but also of a combination of these materials, and it is not necessary that one and the same polyester- and coating material be used for a filter- and screen cloth, although the latter combination is the preferred embodiment of the invention.

As polyester yarns, -cord yarns and/or -monofils there may be used those made from all conventional fiber- and filament-forming polyesters and copolyesters. As dicarboxylic acid components of these polyesters and copolyesters there may be mentioned, for example: terephthalic acid, isophthalic acid, 4,4'-diphenyl dicarboxylic acid, 1,4-, 1,5- and 1,6-naphthalene dicarboxylic acid, 4,4'-sulfonyl dibenzoic acid, hexahydroterephthalic acid, adipic acid or sebacic acid; as diol components, there may be mentioned, for example: aliphatic, cycloaliphatic and araliphatic diols having 2 to 10 carbon atoms such, for example, as ethylene glycol, tri- and tetramethylene glycol, 2,2-dimethyl-propanediol-1,3, 1,4-dimethylol cyclohexane, or p-xylylene glycol. Polyethylene terephthalate is the preferred polyester. As coating material for the polyester yarns, -cord yarns and/or -monofils there may be used thermoplastic materials being resistant to hydrolysis and melting at a temperature above approximately 130° C., especially polyolefins such, for example, as polyethylene, polypropylene and poly-(4-methylpentene-1). When the screens are only subjected to the action of alkaline media, there may be used as coating materials under certain circumstances also polyamides such, for example, as nylon 6 and nylon 66 since these are fairly resistant to the action of alkaline media [cf. F. Fourné "Synthetische Fasern" (Wissenschaftliche Verlagsgesellschaft mbH., Stuttgart 1964), p. 242, table].

The coating is applied to the material of the polyester yarn, -cord yarn and -monofils, for example, by extruding the thermoplastic material by means of an extruder on to all sides of the polyester yarns in the form of a continuous pore-free coating. The thickness of the coating should advantageously be above 50μ.

The filter- and screen cloths of the invention are practically entirely resistant to hydrolysis; they are practically not attacked either by the prolonged action of hot acids and lyes. This is clearly shown by the results of the following hydrolysis tests on non-coated polyethylene terephthalate (PET) cord yarn and on the same cord yarn which has been coated with 200μ thick polypropylene coating.

|  | Treatment time, hours | Ultimate tensile strength percent |
|---|---|---|
| 1 Action of aqueous NaOH of 5% strength at 100° C.: | | |
| PET crude ply yarn | 12 | (¹) |
| PET ply yarn (coated) | 40 | 100 |
| 2 Action of aqueous HCl of 10% strength at 100° C.: | | |
| PET crude ply yarn | 30 | 78 |
| PET ply yarn (coated) | 30 | 99 |

¹ Completely dissolved.

Moreover, the abrasion resistance of the polyester yarns, -cord yarns and -monofils is considerably improved by the coating. In the case of a PET cord yarn which has been coated with a 200μ thick polypropylene coating, the abrasion resistance is more than ten times that of the crude cord yarn.

The filter- and screen cloths of the invention are, for example, used in paper machine wires as well as for other filtering and screening purposes.

FIG. 1 of the accompanying drawing shows a cross-section across an exemplary form of a filter- and screen cloth in accordance with the invention. The coated polyester monofils 1 consist of a polyester monofil core 2 and a coating 3.

Figure 2:
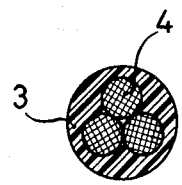

FIG. 2 shows a cross-section across a coated cord with cord yarns 4 and coating 3.

We claim:
1. Filter and screen cloth of discrete yarns or monofils, said yarns or monofils having a polyester core and a continuous, pore-free and extruded coating of a thermoplastic material resistant to hydrolysis and melting at a temperature above about 130° C.
2. The filter and screen cloth of claim 1 wherein the polyester is polyethylene terephthalate.
3. The filter and screen cloth of claim 1 wherein the thermoplastic material is a polyolefin.
4. The filter and screen cloth of claim 3 wherein the polyolefin is polyethylene, polypropylene or poly(4-methyl-pentene-1).
5. The filter and screen cloth of claim 1 wherein the coating has a thickness of above 50 microns.
6. The filter and screen cloth of claim 5 wherein the thickness of the coating is 200 microns.

References Cited

UNITED STATES PATENTS

| | | | |
|---|---|---|---|
| 2,919,474 | 1/1960 | Cole | 264—174 |
| 3,096,204 | 7/1963 | Spangler et al. | 117—98 |
| 3,573,089 | 3/1971 | Tate | 117—98 |

EDWARD G. WHITBY, Primary Examiner

U.S. Cl. X.R.

117—138.8 F, 161 R; 161—159; 210—490, 499; 264—174